US012253918B2

(12) United States Patent
Guntoro et al.

(10) Patent No.: US 12,253,918 B2
(45) Date of Patent: Mar. 18, 2025

(54) INFERENCE CALCULATION FOR NEURAL NETWORKS WITH PROTECTION AGAINST MEMORY ERRORS

(71) Applicant: Robert Bosch GmbH, Stuttgart (DE)

(72) Inventors: Andre Guntoro, Weil der Stadt (DE); Christoph Schorn, Benningen Am Neckar (DE); Jo Pletinckx, Sersheim (DE); Leonardo Luiz Ecco, Stuttgart (DE); Sebastian Vogel, Schaidt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 67 days.

(21) Appl. No.: 17/798,978

(22) PCT Filed: Feb. 12, 2021

(86) PCT No.: PCT/EP2021/053443
§ 371 (c)(1),
(2) Date: Aug. 11, 2022

(87) PCT Pub. No.: WO2021/175566
PCT Pub. Date: Sep. 10, 2021

(65) Prior Publication Data
US 2023/0061541 A1 Mar. 2, 2023

(30) Foreign Application Priority Data

Mar. 2, 2020 (DE) ..................... 10 2020 202 632.7

(51) Int. Cl.
*G06F 11/00* (2006.01)
*G06F 11/14* (2006.01)
(52) U.S. Cl.
CPC ........ *G06F 11/1476* (2013.01); *G06F 11/141* (2013.01)

(58) Field of Classification Search
CPC .......................... G06F 11/1476; G06F 11/141
See application file for complete search history.

(56) References Cited

U.S. PATENT DOCUMENTS 10,474,543 B1 * 11/2019 Kim ..................... G06V 10/255
10,908,987 B1 * 2/2021 Pandey ................. G06F 3/0659
(Continued)

FOREIGN PATENT DOCUMENTS

DE 102010030745 A1 1/2011
DE 102018202095 A1 8/2019
(Continued)

OTHER PUBLICATIONS

Rakin, et al.: "Bit-Flip Attack: Crushing Neural Network with Progressive Bit Search," 2019 IEEE/CVF International Conference on Computer Vision (ICCV), (2019), pp. 1211-1220.
(Continued)

*Primary Examiner* — Philip Guyton
(74) *Attorney, Agent, or Firm* — NORTON ROSE FULBRIGHT US LLP; Gerard A. Messina

(57) ABSTRACT

A method for operating a hardware platform for the inference calculation of a layered neural network. In the method: a first portion of input data which are required for the inference calculation of a first layer of the neural network and redundancy information relating to the input data are read in from an external working memory into an internal working memory of the computing unit; the integrity of the input data is checked based on the redundancy information; in response to the input data here being identified as error-free, the computing unit carries out at least part of the first-layer inference calculation for the input data to obtain a work result; redundancy information for the work result is determined, based which the integrity of the work result can
(Continued)

be verified; the work result and the redundancy information are written to the external working memory.

1 Claim, 3 Drawing Sheets

(56) References Cited

U.S. PATENT DOCUMENTS

| | | | |
|---|---|---|---|
| 2018/0121796 A1 | 5/2018 | Deisher et al. | |
| 2019/0095299 A1* | 3/2019 | Liu | G06F 11/2257 |
| 2019/0251005 A1* | 8/2019 | Guntoro | G06N 3/045 |
| 2020/0074287 A1* | 3/2020 | Mody | G06N 3/063 |
| 2020/0364118 A1* | 11/2020 | Sun | G06F 11/1666 |
| 2021/0073063 A1* | 3/2021 | Kale | G06F 11/3058 |
| 2021/0183438 A1* | 6/2021 | Lee | G06N 3/065 |
| 2021/0380127 A1* | 12/2021 | Woo | B60W 60/0015 |
| 2022/0365853 A1* | 11/2022 | Hopkins | G06F 11/1629 |

FOREIGN PATENT DOCUMENTS

| | | |
|---|---|---|
| DE | 102019122790 A1 | 2/2020 |
| JP | H07295846 A | 11/1995 |
| JP | 2018116469 A | 7/2018 |

OTHER PUBLICATIONS

Schorn, et al.: "Accurate Neuron Resilience Prediction for a Flexible Reliability Management in Neural Network Accelerators," (2018) Design, Automation & Test in Europe Conference & Exhibition (EDAA), pp. 979-984.

International Search Report for PCT/EP2021/053443, Issued Jun. 7, 2021.

Guan et al., "In-Place Zero-Space Memory Protection for CNN," 33rd Conference on Neural Information Processing Systems (NEURIPS 2019), Vancouver, Canada, 2019, pp. 1-10. extension://elhekieabhbkpmcefcoobjddigjcaadp/https://papers.nips.cc/paper/2019/file/1091660f3dff84fd648efe31391c5524-Paper.pdf Downloaded Aug. 10, 2022.

Zhao et al., "FT-CNN: Algorithm-Based Fault Tolerance for Convolutional Neural Networks," Cornell University, 2020, pp. 1-13. extension://elhekieabhbkpmcefcoobjddigjcaadp/https://arxiv.org/pdf/2003.12203.pdf Downloaded Aug. 10, 2022.

Marty et al., "Enabling Overclocking Through Algorithm-Level Error Detection," 2018 International Conference on Field-Programmable Technology (FPT), IEEE, 2018, pp. 174-181.

Mizushina et al., "Layer-By-Layer Adaptively Optimized ECC of NAND Flash-Based SSD Storing Convolutional Neural Network Weight for Scene Recognition," 2018 IEEE International Symposium on Circuits and Systems (ISCAS), IEEE, 2018, pp. 1-5.

Ozen et al., "Sanity-Check: Boosting the Reliability of Safety-Critical Deep Neural Network Applications," 2019 IEEE 28th Asian Test Symposium (ATS), IEEE, 2019, pp. 7-75.

Fernandes Dos Santos et al., "Evaluation and Mitigation of Soft-Errors in Neural Network-Based Object Detection in Three GPU Architectures," 2017 47th Annual IEEE/IFIP International Conference on Dependable Systems and Networks Workshops (DSN-W), IEEE, 2017, pp. 169-176.

* cited by examiner

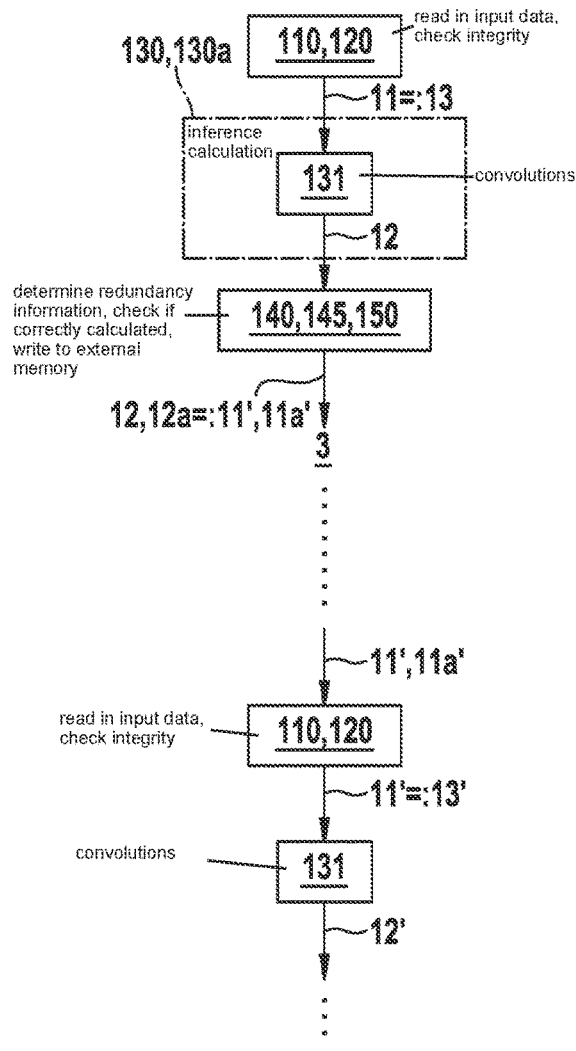
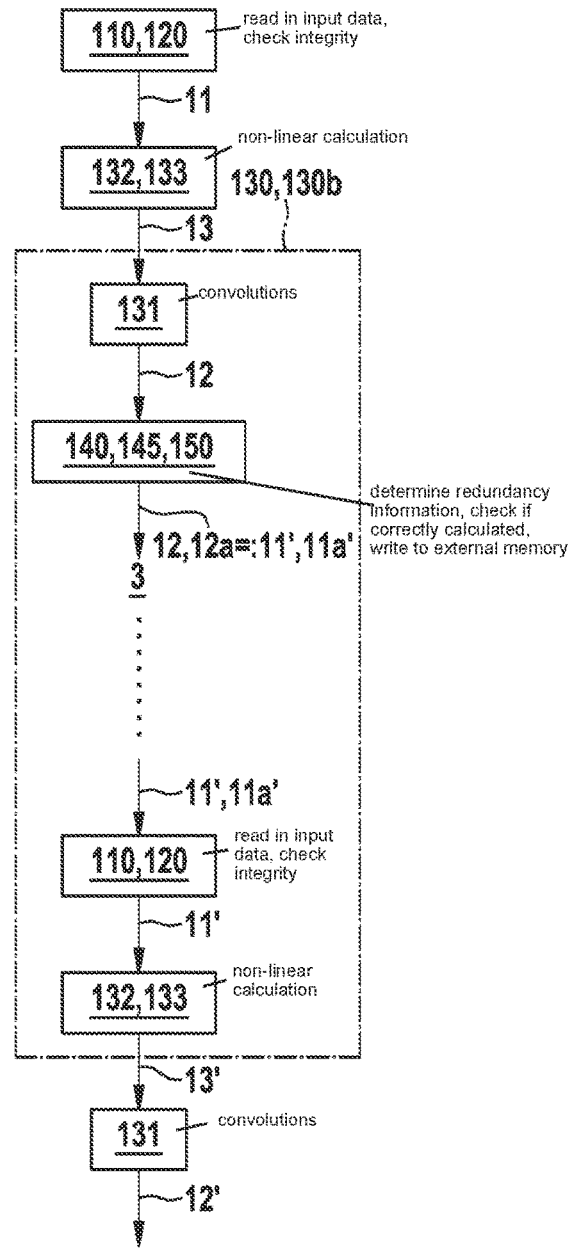
Fig. 2A
Fig. 2B

INFERENCE CALCULATION FOR NEURAL NETWORKS WITH PROTECTION AGAINST MEMORY ERRORS

FIELD

The present invention relates to safeguarding calculations arising during neural network inference operation against transient errors on the hardware platform used.

BACKGROUND INFORMATION

In neural network inference, very large numbers of neuron activations are calculated by inputs which are supplied to these neurons being summed in weighted manner on the basis of weightings derived from training of the neural network. A plurality of multiplications therefore take place, the results of which are subsequently added together (multiply-and-accumulate, MAC). In particular in mobile applications, such as for example in the case of at least partially automated driving of vehicles in road traffic, neural networks are implemented on hardware platforms which specialize in such calculations. These platforms are particularly efficient in terms of hardware costs and energy usage per unit of computing power.

As the integration density of these hardware platforms increases, the probability of transient, i.e., sporadic, computational errors increases. For example, a high-energy photon from background radiation impinging on a memory location or processing unit of the hardware platform can randomly "flip" a bit. Furthermore, especially in a vehicle, the hardware platform shares the vehicle electrical system with a plurality of other consumers that can inject interference such as voltage spikes into the hardware platform. Tolerances in this respect are becoming tighter as the integration density of the hardware platform increases.

German Patent Application No. DE 10 2018 202 095 A1 describes a method with which, when a neural network processes an input value tensor to yield an output value tensor, miscalculated output values can be identified and also corrected by way of additional check calculations.

SUMMARY

In the context of the present invention, a method is provided for operating a hardware platform for inference calculation in a layered neural network. The hardware platform has a computing unit with an internal working memory and an external working memory arranged outside said computing unit and connected to said computing unit.

The background to this structure is that in relatively large neural networks, such as for example for interpreting observation data from a vehicle's environment, the inference calculation of each layer of the network frequently entails processing substantially more data than can fit into the computing unit's internal memory.

In very general terms, the neural network can thus for example be configured as a classifier for assigning observation data, such as for example camera images, thermal images, radar data, lidar data or ultrasound data, to one or more classes of a predetermined classification. These classes may, for example represent objects or states which are to be detected in the observed region. The observation data may for example originate from one or more sensors mounted on a vehicle. On the basis of the assignment to classes provided by the neural network, it is then for example possible to derive actions of a driver assistance system or of a system for at least partially automated driving of the vehicle which match the specific traffic situation. The neural network may for example be a convolutional neural network (CNN) subdivided into layers, in which one or more convolutional kernels can be applied to the input data.

According to an example embodiment of the present invention, for the purposes of the method, a first portion of input data which are required for the inference calculation of a first layer of the neural network and redundancy information relating to said input data can be read in from the external working memory into the internal working memory of the computing unit. The integrity of the input data is checked on the basis of the redundancy information.

Redundancy information in this connection is taken to mean any kind of information which, in conjunction with the input data, enables a determination to be made as to whether the input data have, with a high degree of probability, been correctly saved in the external working memory and have also been correctly read in again therefrom. For example, the data can be saved in duplicate in the external working memory and read in again therefrom. Compressed redundancy information, which is calculated from the input data and is much smaller in volume than the input data themselves, is more efficient in terms of memory requirements and data transmission bandwidth. Examples are hashes or other checksums.

In response to the input data having been identified as error-free during the integrity check, the computing unit carries out at least part of the first-layer inference calculation for these input data in order to obtain a work result. Redundancy information for said work result is in turn determined, on the basis of which the integrity of the work result can be verified. The work result and the redundancy information are written to the external working memory.

It has been found that the inference calculation for a large neural network, in which the data necessary for calculating a layer do not completely fit in the internal working memory of the computing unit, is in principle susceptible to transient errors which occur randomly in the external working memory and on the communication link between the computing unit and the external working memory. Both for the communication link and for the external working memory, it is possible to state a measure of reliability in terms of how many bits are transferred or stored on average before a transient error is to be expected.

The overall volume of data which has to stored, read out and transported in the course of a complete inference calculation is so large that, in the case of common external working memories and communication links, a transient error can be expected with a probability relevant to the application.

In this situation it would theoretically be possible to replace the working memory or communication link with a version in which the probability of transient errors occurring is even lower. However, the price for doing so rises disproportionately to the gain in reliability and there is no guarantee that a transient error will not occur within a certain period of time.

Integrity checking can eliminate the influence of transient errors on the results provided by the neural network as a whole. As soon as an error in the data is identified, that part of the inference calculation which generated these data can, for example, be repeated in order to obtain a correct version of these data. Since the errors are transient, i.e., sporadically occurring, reacquiring data for the application in question which have been corrupted in the external working memory or during transport does not result overall in any appreciable slowdown.

As a result, the combination of a computing unit, in which only a proportion of the data necessary for the inference calculation of a layer can be stored, with an external working memory, in which the work results in each case delivered by the computing unit can be built up piece by piece to obtain the overall result of the inference calculation for the layer, can significantly reduce the costs of implementing the hardware platform for a specified inference task. While it would indeed in principle be possible to simply replace the computing unit with one capable of performing the complete inference calculation for a layer internally without recourse to an external working memory, this would be much costlier and also less energy-efficient.

An advantage of improved reliability by the identification of errors does not necessarily involve breaking down the input data into a plurality of small portions. Use of the external working memory and communication with said external working memory can be protected in the same way if there is only one portion of the input data which comprises the complete input data.

In one particularly advantageous configuration of the present invention, all of a plurality of portions of input data required for the first-layer inference calculation are read in from the external working memory and processed with the computing unit. The input data which are required for the inference calculation of a second layer of the neural network are then read in from the external working memory and processed with the computing unit. In this way, one and the same external working memory can be used for the inference calculation of each layer in turn. The external working memory thus only needs to be of such a size as is required for the inference calculation of one layer at a time.

The work result may in particular for example comprise outputs from neurons of the first layer which in each case contain a weighted sum of inputs of these neurons. Each input of the neuron is then thus multiplied by a weight and the products are summed. The result may additionally be provided with an additive bias which is associated with the neuron. Said calculation of the output of the neuron is linear in the inputs of the neurons.

Said linearity in turn makes it possible, in a further particularly advantageous configuration, additionally to check, on the basis of the redundancy information for the work result, whether, before writing to the external working memory, the work result has been correctly calculated. An item of redundancy information can thus be determined which can be used both for checking for correct calculation and for checking integrity after writing and reading out from the external memory. In this way, protection against transient errors can additionally be extended to transient errors which occur in the computing unit itself without any additional demands on computing time or memory. As a consequence, the reliability of the final result provided by the neural network as a whole can be increased still further.

According to an example embodiment of the present invention, if the inference calculation for example involves convolving data using a plurality of identically sized convolutional kernels, redundancy information which can be put to dual use in this manner can be determined for example by convolving these data with a control kernel which is the sum of these convolutional kernels. If the data to be convolved for example take the form of a three-dimensional matrix, and convolutional kernels which are the same size as said matrix in the third dimension are successively shifted through the matrix in the other two dimensions, an output matrix is obtained for each convolutional kernel. The redundancy information adds only one further control matrix of the same size to said plurality of output matrices. This is highly efficient in terms of memory requirements. In addition, convolution with the control kernel can be performed with hardware acceleration on the computing unit in the same manner as convolution with the other convolutional kernels.

Checking for correct calculation may then for example involve comparing each element of the control matrix with the sum of the elements of the output matrices corresponding to said element. These corresponding elements are located within the output matrices at the same position in which the element of the control matrix is located within the control matrix. Using the associative law of mathematics, through convolution with the control kernel the sum is thus calculated by a different method across all the output matrices, which should lead to the same result. This can be understood by the analogy that, when counting coins, the same amount of money should be obtained irrespective of whether the individual values of the coins are directly added together or whether coins of identical value are first bundled into rolls and the values of the rolls added together.

In this case, checking whether the work result has been correctly calculated, on the one hand, and checking whether the work result has been correctly written to the external memory and read back in therefrom, on the other hand, can in each case proceed in the same manner.

Said dual use of the redundancy information can still be obtained even if the inference calculation in the first layer includes at least one nonlinear calculation step in the inputs of the neurons of said layer. Said nonlinear calculation step is for this purpose shifted to a point in time at which the work result has been read back in from the external working memory into the internal working memory.

If, for example, the inference calculation as a whole comprises said calculation of the outputs from neurons, the use of a nonlinear activation function to these outputs and a dimensional reduction of the data (for instance by pooling), then the linearly calculated outputs of the neurons, in conjunction with said redundancy information, can be written to the external memory as the work result immediately it has been established that they have been correctly calculated. At said point in time, the inference calculation for the first layer is not yet complete because the activation function and the dimensional reduction are still to be applied. It has, however, been found that these two steps only become truly imperative when the inference calculation for the next layer is pending. For this purpose, once the linearly calculated work result of the first layer has been read out from the external working memory into the internal working memory of the computing unit and verified for integrity, the activation function and dimensional reduction can be applied. Immediately thereafter, the outputs of the neurons of the next layer can be linearly calculated and in turn, together with redundancy information, written to the external working memory.

It is alternatively also possible to carry out the first-layer inference calculation in full, i.e., including said nonlinear steps, for the portion of the input data currently being handled and only then to write said work result to the external working memory. The external working memory then contains not only an interim result of the first-layer inference calculation but also the final result. This may be advantageous if said final result is to be evaluated in the specific application even before the neural network as a whole has been completely processed. The price paid for this is that redundancy information, which was determined for the purpose of checking for correct linear calculation before the nonlinear operations were applied, becomes invalid due to the nonlinear operations. It therefore has to be recalculated once these nonlinear operations are complete and before the work result is written to the external working memory.

In a further particularly advantageous configuration of the present invention, in response to the input data being identified as erroneous and/or the work result being identified as erroneously calculated, the error in the input data, or in the work result, is corrected on the basis of the redundancy information. For example, the redundancy information discussed above, which is determined by convolution with the control kernel, can be further extended to include additional redundancy information which allows the error to be more precisely located. The particular degree of granularity which is reasonable here may, for example, be determined by:

how much additional computing time and memory space is required for the extended redundancy information and, on the other hand, how much computing time is saved, in view of the expected error frequency, by the fact that only relatively small units of the work result, or of the input data, have to be reacquired.

Previous considerations assumed that the errors are transient errors which occur at random times. A cluster of errors may, however, be an indication that the errors are no longer completely random and transient, but instead that a hardware component or memory location is beginning to fail. For instance, if interdiffusion occurs due to overheating or aging in a semiconductor at a pn junction between a layer doped with holes and a layer doped with electrons, the amount of energy required to flip a bit in the memory may be reduced relative to the normal state, and gamma quanta or charged particles from background radiation, for instance, are more likely to provide this amount of energy. While the errors will indeed still occur at random times, they will increasingly cluster at the hardware component or storage cell with the damaged pn junction.

Accordingly, in a further particularly advantageous configuration of the present invention, in response to input data being identified as erroneous and/or the work result being identified as erroneously calculated, an error counter is incremented in relation to at least one memory area of the external working memory or to at least one hardware component that comes into consideration as the cause of the error. The error counters for comparable components may then be compared with one another, for example in the course of general maintenance. If, for example, one of a plurality of nominally identically constructed memory modules or hardware components stands out with a conspicuously elevated error counter, there may be an impending defect in this memory module or hardware component.

Accordingly, in particular for example in response to its being identified that the error counter has exceeded a specified threshold value, the hardware component, or memory area, may be identified as defective. In response, the hardware platform may for example be reconfigured such that, instead of the hardware component or memory area which has been identified as defective, a standby hardware component or standby memory area is used for further calculations. It may be appropriate to provide such standby components in particular for fully automated driving of vehicles, where provision is no longer made for a driver to take over control even in the event of an error. In the event of a defect, the vehicle can then still get to a service workshop ("limp home mode") without requiring costly towing.

Optical image data, thermal image data, video data, radar data, ultrasound data, and/or lidar data are advantageously provided as input data for the neural network. These are the most important types of measurement data, on the basis of which at least partially self-driving vehicles orient themselves in the traffic space. The measurement data may be obtained by a physical measurement process, and/or by partial or complete simulation of such a measurement process, and/or by partial or complete simulation of an engineering system observable with such a measurement process. For example, photorealistic images of situations can be generated by means of computational tracking of light rays ("raytracing") or also with generative neural networks (for instance Generative Adversarial Networks, GAN). For example, insights from the simulation of an engineering system, such as for instance positions of certain objects, may also here be introduced as constraints. The generative network can be trained purposefully to generate images which satisfy these constraints (for instance conditional GAN, cGAN).

The input data may in particular for example be the input data of the neural network as a whole. These are those input data to which the first processing steps of the neural network are applied. In a layered neural network, these may for example be those input data which are supplied to the first layer.

The work results of the neural network, for example the output from the final layer of said network, may be processed to yield a control signal. A vehicle, and/or a system for the quality control of mass-produced products, and/or a medical imaging system, and/or an access control system, can then be controlled with said control signal. In this connection, the above-described error checking has the effect that it is advantageously possible to avoid sporadic malfunctions which "come from nowhere" without a specific cause and would thus normally be extremely difficult to diagnose.

The work results may in particular for example be the work results of the neural network as a whole. These are those work results to which the neural network applies no further processing steps. In a layered neural network, these may for example be those work results which are generated by the final layer.

The methods may in particular be entirely or partially computer-implemented. The present invention therefore also relates to a computer program with machine-readable instructions which, when executed on one or more computers, cause the computer or computers to carry out one of the described methods. For these purposes, control devices for vehicles and embedded systems for engineering devices which are likewise capable of executing machine-readable instructions are also to be considered computers.

The present invention likewise also relates to a machine-readable data storage medium and/or to a download product including the computer program. A download product is a digital product which is transferable via a data network, i.e., downloadable by a user of the data network, which can for example be offered for sale in an online store for immediate download.

A computer may furthermore be equipped with the computer program, with the machine-readable data storage medium or with the download product, according to an example embodiment of the present invention.

Further measures which improve the present invention are described in greater detail below with reference to figures,

BRIEF DESCRIPTION OF THE DRAWINGS

FIGS. 2A and 2B show a breakdown of the inference calculation 130 without nonlinearity 132 (FIG. 2A) and with nonlinearity 132 (FIG. 2B), according to example embodiments of the present invention.

DETAILED DESCRIPTION OF EXAMPLE EMBODIMENTS

Figure 1:
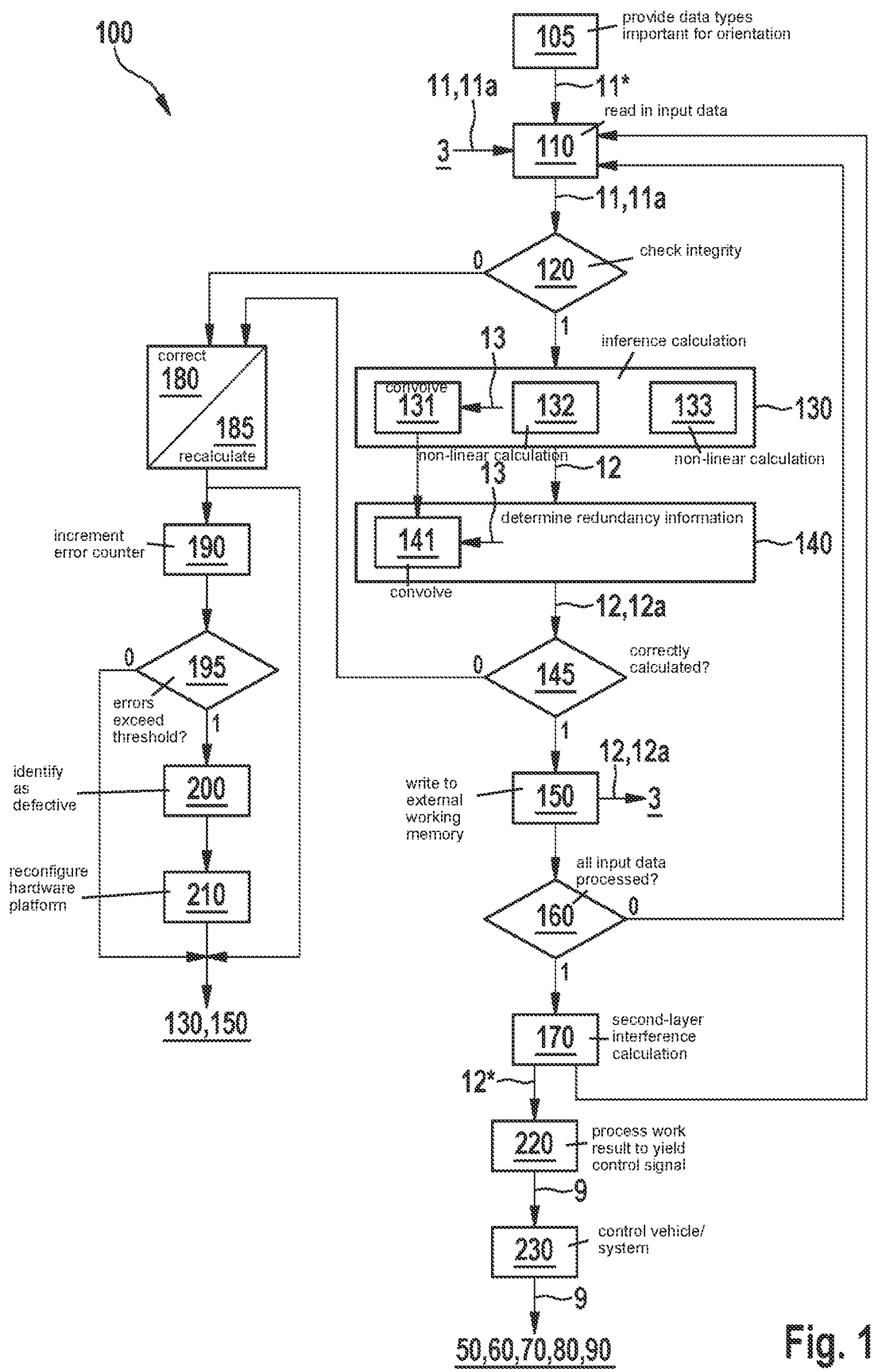
FIG. 1 shows an exemplary embodiment of the method 100, according to the present invention.
Figure 3:
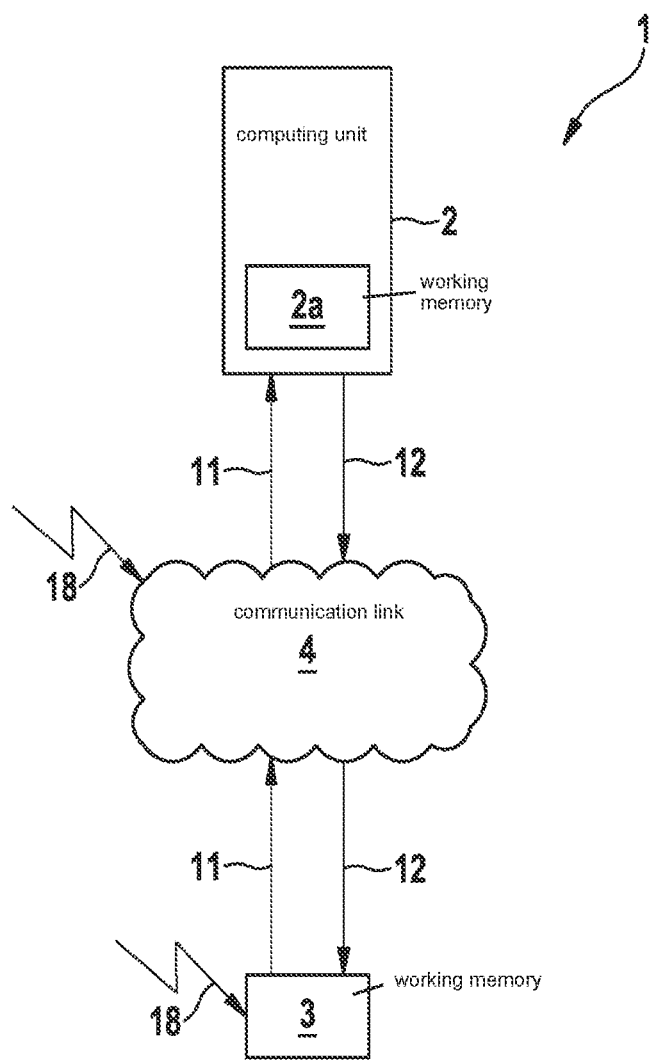
FIG. 3 shows an exemplary embodiment of the hardware platform 1, according to the present invention.

FIG. 1 is a schematic sequence diagram of an exemplary embodiment of the method 100. According to step 105, those data types which are specifically the most important for the orientation of an at least partially self-driving vehicle in road traffic may be provided as input data in the input matrix 1. FIG. 3 explains the hardware platform 1 which is operated by the method 100 in greater detail.

In step 110, input data 11 which are required for the inference calculation of a first layer of the neural network together with associated redundancy information 11a are read in from the external working memory 3. In step 120, the integrity of the input data 11 is checked on the basis of the redundancy information 11a. If said check is positive (truth value 1), i.e., the input data 11 have been identified as error-free, in step 130 the computing unit 2 carries out at least part of the first-layer inference calculation for the input data 11 in order to obtain a work result 12.

In step 140, redundancy information 12a for the work result 12 is determined, on the basis of which the integrity of the work result 12 can be verified. Optionally, in step 145, it is additionally verified on the basis of said redundancy information 12a whether the work result 12 has been correctly calculated. If this is the case (truth value 1), in step 150 the work result 12 together with the redundancy information 12a is written to the external working memory 3.

In the example shown in FIG. 1, processing of the neural network as a whole is organized such that it is checked in step 160 whether all the input data which are required for the first-layer inference calculation have already been processed. If this is not yet the case (truth value 0), the method branches back to step 110 and the next portion of input data 11 of said first layer is read in from the external working memory 3. If, however, the complete first layer has already been processed (truth value 1), the method switches over in step 170 to a second-layer inference calculation. In other words, the method branches back again to step 110 in order to read in portions of input data 11 from the external working memory 3. However, these are then input data 11 of the second layer. Once all the layers have been processed, the work result 12* of the neural network as a whole is output. Said work result 12* can be processed to yield a control signal 9 in step 220. According to step 230, said control signal 9 can then be used to control a vehicle 50, and/or a classification system 60, and/or a system 70 for the quality control of mass-produced products, and/or a system 80 for medical imaging, and/or an access control system 90.

According to block 131, the first-layer inference calculation 130 may in particular comprise convolving data 13 with a plurality of convolutional kernels. According to block 132, said inference calculation 130 may also comprise at least one nonlinear calculation step in the inputs of the neurons. If said nonlinear calculation step according to block 133 is only carried out at a subsequent point in time, at which the work result 12 is again located in the internal working memory 2a of the computing unit 2 after having been read back in from the external working memory 3, this saves computing time and memory space. In this case, the work result 12 can be saved in the external working memory 3 in a state which is not yet "contaminated" by nonlinearity. The same redundancy information 12a may then be used both for the check 145 for correct calculation of the work result 12a and for the subsequent check 120 for correct storage and correct data transfer.

According to block 141, the redundancy information 12a can be determined by convolution with a control kernel which is a sum of the stated convolutional kernels.

If an error is identified in one of the checks 120 or 145 (truth value 0 in the respective check), according to block 180 the error in the input data 11, or in the work result 12, can be corrected on the basis of the respective redundancy information 11a, 12a. Alternatively, the input data 11, or the work result 12, can be recalculated according to block 185.

In the example shown in FIG. 1, an error counter for a memory area of the external working memory 3 or a hardware component which comes into consideration as the cause of the error can then additionally be incremented according to block 190. In step 195, it can then be checked whether said error counter has exceeded a specified threshold value. If this is the case (truth value 1), the memory area or the hardware component can be identified as defective according to block 200. According to block 210, the hardware platform 1 can then be reconfigured such that a standby memory area or a standby hardware component is respectively used for further calculations.

If the input data 11, or the work result 12, have been corrected according to block 180 or recalculated according to block 185, the originally intended inference calculation 130, or the originally intended storage 150 in the external working memory 3, can be resumed.

FIG. 2 shows two examples of how the inference calculation 130 can be organized.

FIG. 2a shows a simple example in which the inference calculation 130, 130a comprises only convolutions 131 of the input data 11 to yield a work result 12. As explained above, the calculations which lead to the work result 12 are then linear in the inputs supplied to the neurons. The same redundancy information 12a may then be used both for the check 145 for correct calculation 130 and for the subsequent check 120 for correct saving and reading in.

In this example, the data 13 which are convolved in block 131 are identical to the input data 11. The work result 12 corresponds to the complete result of the inference calculation 130. When the next layer is processed, said work result 12 is read back in from the external working memory 3 as input data 11', and the redundancy information 12a stored with the work result 12 is the redundancy information 11a' with which these input data 11' are verified. The next convolution 131 gives rise to the next work result 12'.

FIG. 2b shows a further example in which the inference calculation 130, 130b contains a nonlinearity 132. In contrast with FIG. 2a, the data 13 which are supplied to the convolution 131 are now no longer identical to the input data 11, but are instead obtained from these input data 11 by application of the nonlinearity 132. The convolution 131 itself, however, again contains only linear operations, such that the redundancy information 12a can be put to dual use in a manner similar to FIG. 2a.

In contrast with FIG. 2a, the inference calculation 130, 130b is not yet complete at the point in time at which the work result 12 is saved in the external memory 3. Instead, it is taken to completion at a subsequent point in time when convolution 131 for the next layer is pending. In the intervening period, a linear intermediate product of the nonlinear inference calculation 130, 130b is therefore present in the external memory 3.

FIG. 3 shows an exemplary embodiment of the hardware platform 1. A computing unit 2 with an internal working memory 2a is linked via a communication link 4 to an external working memory 3. Work results 12 are buffered in said external working memory 3 so that they can subsequently be read back in as input data 11 for the inference calculation of new layers. The external working memory 3 and the communication link 4 are susceptible to transient errors 18 which can be identified and corrected using the method 100.

What is claimed is:

1. A method for operating a hardware platform for an inference calculation of a layered neural network, the hardware platform including a computing unit with an internal working memory and an external working memory arranged outside the computing unit and connected to the computing unit, the method comprising the following steps:

reading in a first portion of input data which are required for the inference calculation of a first layer of the neural network and redundancy information relating to said input data from the external working memory into the internal working memory of the computing unit;

checking integrity of the input data based on the redundancy information;

in response to the input data being identified as error-free, carrying out, by the computing unit at least part of the first-layer inference calculation for the input data to obtain a work result;

determining redundancy information for the work result, based on which an integrity of the work result can be verified; and writing the work result and the redundancy information to the external working memory, wherein the work result includes outputs from neurons of the first layer which each contain a weighted sum of inputs of the neurons of the first layer, wherein the inference calculation includes convolution of data with a plurality of convolutional kernels, and wherein the redundancy information is determined by convolving the data with a control kernel which is a sum of the convolutional kernels.

* * * * *